(12) United States Patent
Kook et al.

(10) Patent No.: US 10,247,281 B2
(45) Date of Patent: Apr. 2, 2019

(54) PLANETARY GEAR TRAIN OF AUTOMATIC TRANSMISSION FOR VEHICLE

(71) Applicant: HYUNDAI MOTOR COMPANY, Seoul (KR)

(72) Inventors: Jae Chang Kook, Hwaseong-si (KR); Seong Wook Hwang, Gunpo-si (KR); Hyun Sik Kwon, Seoul (KR); Ki Tae Kim, Incheon (KR); Wonmin Cho, Hwaseong-si (KR); Wookjin Jang, Yongin-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 155 days.

(21) Appl. No.: 15/370,501

(22) Filed: Dec. 6, 2016

(65) Prior Publication Data
US 2018/0073606 A1   Mar. 15, 2018

(30) Foreign Application Priority Data
Sep. 13, 2016 (KR) .......... 10-2016-0118081

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC ............... F16H 3/66; F16H 2200/2046; F16H 2200/2012; F16H 2200/0069
See application file for complete search history.

(56) References Cited

U.S. PATENT DOCUMENTS 8,574,113 B1 * 11/2013 Goleski .................... F16H 3/66
                                                                475/282

FOREIGN PATENT DOCUMENTS

| KR | 10-2016-0071096 A | 6/2016 |
| KR | 10-2016-0071097 A | 6/2016 |
| KR | 10-2016-0079518 A | 7/2016 |

* cited by examiner

*Primary Examiner* — Mark J Beauchaine
(74) *Attorney, Agent, or Firm* — Brinks Gilson & Lione

(57) ABSTRACT

The present disclosure provides a planetary gear train of an automatic transmission for a vehicle including an input shaft, an output shaft, four planetary gear sets respectively having three rotational elements, and six control elements for selectively interconnecting the rotational elements and a transmission housing.

10 Claims, 2 Drawing Sheets

FIG. 2

| Shift-stage | Control element | | | | | | Gear ratio |
|---|---|---|---|---|---|---|---|
| | C1 | C2 | C3 | C4 | B1 | B2 | |
| D1 | | | ● | | ● | ● | 4.900 |
| D2 | ● | | | | ● | ● | 3.085 |
| D3 | ● | | ● | | | ● | 2.130 |
| D4 | ● | | | ● | | ● | 1.741 |
| D5 | | ● | ● | ● | | ● | 1.512 |
| D6 | | ● | ● | | | ● | 1.277 |
| D7 | ● | ● | ● | | | | 1.000 |
| D8 | | | ● | ● | ● | | 0.845 |
| D9 | | ● | | ● | ● | | 0.681 |
| D10 | | ● | | | ● | | 0.630 |
| REV | | ● | | | ● | ● | -4.773 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2016-0118081 filed on Sep. 13, 2016, which is incorporated herein by reference in its entirety.

FIELD

The present disclosure relates to a planetary gear train of an automatic transmission for a vehicle.

BACKGROUND

The statements in this section merely provide background information related to the present disclosure and may not constitute prior art.

In the field of an automatic transmission, more multiplicity of shift-stages is used to enhance fuel efficiency and drivability of a vehicle. The increase of oil price makes it difficult to improve fuel consumption of a vehicle.

The engine downsizing has been attempted for purposes of weight reduction and fuel efficiency. Simultaneously, the development of more shift stages of an automatic transmission has caused to provide the enhanced driving stability and fuel efficiency.

For more shift-stages of an automatic transmission, the number of parts is typically increased, which may affect installability, production cost, weight and/or power flow efficiency.

In that aspect, less number of parts is desired to enhance fuel efficiency of an automatic transmission having more shift-stages.

An eight-speed automatic transmission has been introduced recently and a planetary gear train for an automatic transmission enabling more shift-stages is underdevelopment.

An automatic transmission of eight or more shift-stages typically includes three to four planetary gear sets and five to seven control elements (frictional elements), and this may largely affect the weight of the vehicle.

In this regard, disposing planetary gear sets in parallel or employing dog clutches instead of wet-type control elements has been attempted. However, such an arrangement may not be widely applicable, and using dog clutches may easily deteriorate shift-feel.

SUMMARY

The present disclosure provides a planetary gear train of an automatic transmission for a vehicle having shift-stages of ten forward speeds and one reverse speed by less number of parts, thereby improving power delivery performance and fuel consumption by multi-stages of an automatic transmission, as well as driving stability of a vehicle by utilizing a low rotation speed of an engine.

A planetary gear train according to one form of the present disclosure includes an input shaft configured to receive an engine torque; an output shaft configured to output a shifted torque; a first planetary gear set having a first, a second, and a third rotational elements; a second planetary gear set having a fourth, a fifth, and a sixth rotational elements; a third planetary gear set having a seventh, an eighth, and a ninth rotational elements; a fourth planetary gear set having a tenth, an eleventh, and a twelfth rotational elements; a first shaft connected to the first rotational element and the fourth rotational element; a second shaft connected to the second rotational element and the twelfth rotational element; a third shaft connected to the third rotational element; a fourth shaft connected to the fifth rotational element and connected to the input shaft; a fifth shaft connected with the sixth rotational element and the seventh rotational element, and selectively connected to the second shaft; a sixth shaft connected to the eighth rotational element; a seventh shaft connected to the ninth rotational element and the tenth rotational element, and selectively connected to the fourth shaft and the fifth shaft respectively; and an eighth shaft connected to the eleventh rotational element, selectively connected to the sixth shaft, and connected to the output shaft.

The first shaft and the third shaft may be selectively connected to a transmission housing, respectively.

The first, the second, and the third rotational elements of the first planetary gear set may be respectively a first sun gear, a first planet carrier, and a first ring gear of the first planetary gear set. The fourth, the fifth, and the sixth rotational elements of the second planetary gear set may be respectively a second sun gear, a second planet carrier; and a second ring gear of the second planetary gear set. The seventh, the eighth, and the ninth rotational elements of the third planetary gear set may be respectively a third sun gear, a third planet carrier, and a third ring gear of the third planetary gear set. The tenth, the eleventh, and the twelfth rotational elements of the fourth planetary gear set may be respectively a fourth sun gear, a fourth planet carrier, and a fourth ring gear of the fourth planetary gear set.

The first, the second, the third, and the fourth planetary gear sets may be arranged in an order the first, the second, the third, and the fourth from an engine side.

A planetary gear train according to one form of the present disclosure may further include a first clutch selectively connecting the fifth shaft and the seventh shaft; a second clutch selectively connecting the sixth shaft and the eighth shaft; a third clutch selectively connecting the fourth shaft and the seventh shaft; a fourth clutch selectively connecting the second shaft and the fifth shaft; a first brake selectively connecting the first shaft and the transmission housing; and a second brake selectively connecting the third shaft and the transmission housing.

A planetary gear train according to one form of the present disclosure may realize at least ten forward speeds and at least one reverse speed by operating the four planetary gear sets and controlling six control elements.

In addition, a planetary gear train according to one form of the present disclosure may improve driving stability when realizing shift-stages become suitable for rotation speed of an engine.

Moreover, a planetary gear train according to one form of the present disclosure may increase engine driving efficiency by multi-stages of an automatic transmission, and may further improve power delivery performance and fuel efficiency.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2 is an operational chart for respective control elements at respective shift-stages in a planetary gear train.

Figure 1:
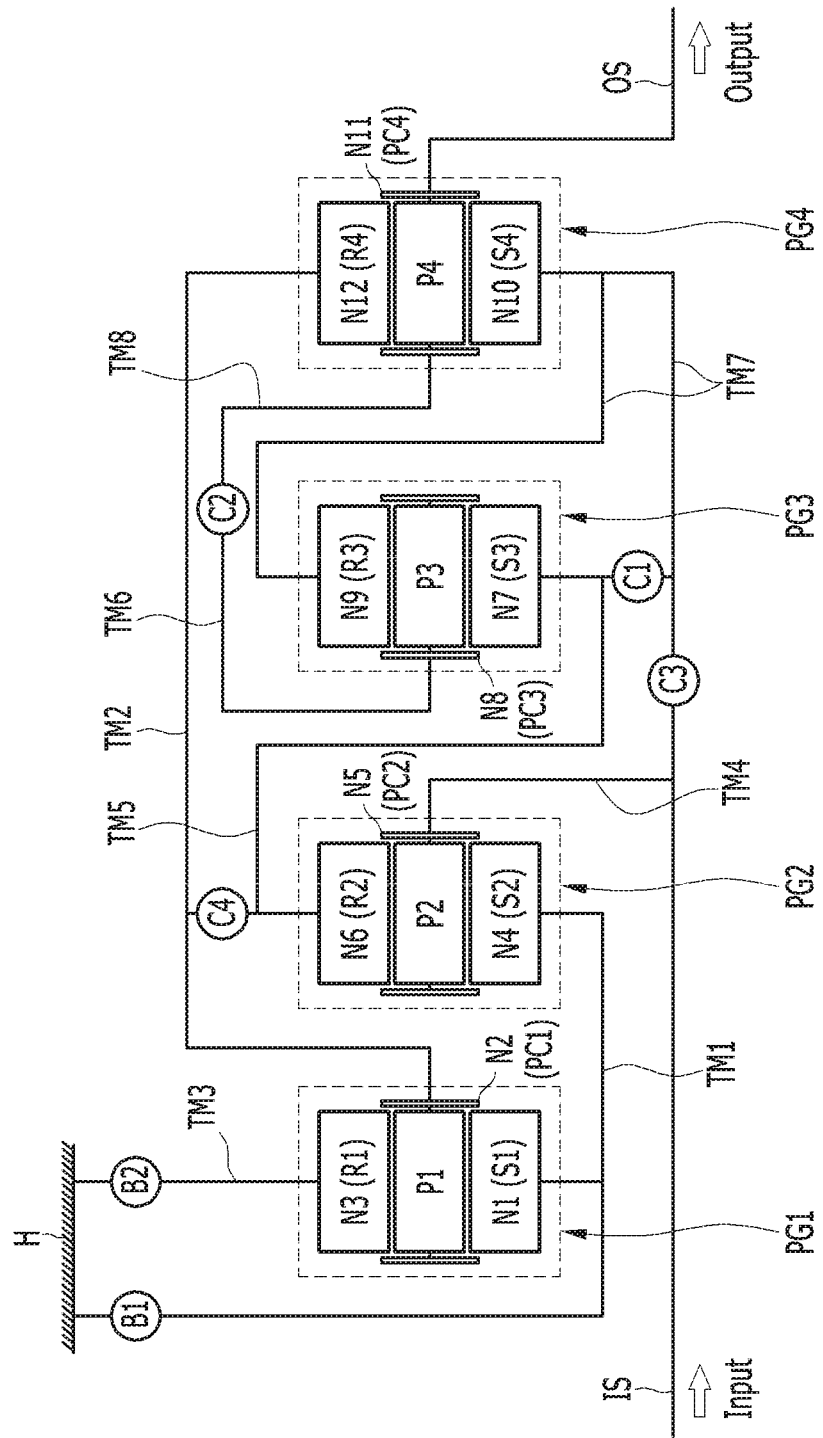
FIG. 1 is a schematic diagram of a planetary gear train.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second and the like is to avoid any confusion as the names of the components are identical to one another; thus, an order thereof is not particularly limited.

FIG. 1 is a schematic diagram of a planetary gear train according to one form of the present disclosure.

Referring to FIG. 1, a planetary gear train according to one form of the present disclosure includes a first, a second, a third, and a fourth planetary gear sets PG1, PG2, PG3, and PG4 arranged on a same axis, input shaft IS, output shaft OS, eight shafts TM1 to TM8 connected to rotational elements of the first, the second, the third, and the fourth planetary gear sets PG1, PG2, PG3, and PG4, control elements of four clutches C1 to C4 and two brakes B1 and B2, and a transmission housing H.

Torque taken from the input shaft IS is shifted by cooperative operation of the first, the second, the third, and the fourth planetary gear sets PG1, PG2, PG3, and PG4, and then delivered through the output shaft OS.

The planetary gear sets are arranged in the order of the first, the second, the third, and the fourth from an engine side.

The input shaft IS is an input member and the torque from a crankshaft of an engine is delivered into the input shaft IS, after being torque-converted through a torque converter.

The output shaft OS is an output member, and being arranged on a same axis with the input shaft IS, delivers a shifted driving torque to a drive shaft through a differential apparatus (not shown).

The first planetary gear set PG1 is a single pinion planetary gear set, and includes a first sun gear S1, a first planet carrier PC1 that rotatably supports a plurality of first pinion gears P1 externally gear-meshed with the first sun gear S1, and a first ring gear R1 that is internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set, and includes a second sun gear S2, a second planet carrier PC2 that rotatably supports a plurality of second pinion gears P2 externally gear-meshed with the second sun gear S2, and a second ring gear R2 that is internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set, and includes a third sun gear S3, a third planet carrier PC3 that rotatably supports a plurality of third pinion gears P3 externally gear-meshed with the third sun gear S3, and a third ring gear R3 that is internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set, and includes a fourth sun gear 34, a fourth planet carrier PC4 that rotatably supports a plurality of fourth pinion gears P4 externally gear-meshed with the fourth sun gear S4, and a fourth ring gear R4 that is internally gear-meshed with the plurality of fourth pinion gears P4. The fourth sun gear S4 acts as a tenth rotational element N10, the fourth planet carrier PC4 acts as an eleventh rotational element N11, and the fourth ring gear R4 acts as a twelfth rotational element N12

In the arrangement of the first, second, third, and fourth planetary gear sets PG1, PG2, PG3, and PG4, the first rotational element N1 and the fourth rotational element N4 are directly interconnected, the second rotational element N2 and the twelfth rotational element N12 are directly interconnected, the sixth rotational element N6 and the seventh rotational element N7 are directly interconnected, and the ninth rotational element N9 and the tenth rotational element N10 are directly interconnected, respectively, by one of eight shafts TM1 to TM8.

The eight shafts TM1 to TM8 are arranged as follows.

Each of the eight shafts TM1 to TM8 may be a rotational member that directly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

The first shaft TM1 is connected to the first rotational element N1 (first sun gear S1) and the fourth rotational element N4 (second sun gear S2), and selectively connected to the transmission housing H, thereby selectively acting as a fixed element.

The second shaft TM2 is connected to the second rotational element N2 (first planet carrier PC1) and the twelfth rotational element N12 (fourth ring gear R4).

The third shaft TM3 is connected to the third rotational element N3 (first ring gear R1), and selectively connected to the transmission housing H, thereby selectively acting as a fixed element.

The fourth shaft TM4 is connected to the fifth rotational element N5 (second planet carrier PC2), and directly connected to the input shaft IS, thereby always acting as an input element.

The fifth shaft TM5 is connected to the sixth rotational element N6 (second ring gear R2) and the seventh rotational element N7 (third sun gear S3), and selectively connected to the second shaft TM2.

The sixth shaft TM6 is connected to the eighth rotational element N8 (third planet carrier PC3).

The seventh shaft TM7 is connected to the ninth rotational element N9 (third ring gear R3) and the tenth rotational element N10 (fourth sun gear S4), and selectively connected to the fourth shaft TM4 and the fifth shaft TM5 respectively.

The eighth shaft TM8 is connected to the eleventh rotational element N11 (fourth planet carrier PC4), selectively connected to the sixth shaft TM6, and directly connected to the output shaft OS, thereby always acting as an output element.

The eight shafts TM1 to TM8, the input shaft IS, and the output shaft OS may be selectively interconnected to one another by control elements of four clutches C1, C2, C3, and C4.

The eight shafts TM1 to TM8 may be selectively connected to the transmission housing H, by control elements of two brakes B1 and B2.

The four clutches C1 to C4 and the two brakes B1 and B2 are arranged as follows.

The first clutch C1 is arranged between the fifth shaft TM5 and the seventh shaft TM7, and selectively connects the fifth shaft TM5 and the seventh shaft TM7, thereby controlling power delivery therebetween.

The second clutch C2 is arranged between the sixth shaft TM6 and the eighth shaft TM8, and selectively connects the sixth shaft TM6 and the eighth shaft TM8, thereby controlling power delivery therebetween.

The third clutch C3 is arranged between the fourth shaft TM4 and the seventh shaft TM7, and selectively connects the fourth shaft TM4 and the seventh shaft TM7, thereby controlling power delivery therebetween.

The fourth clutch C4 is arranged between the second shaft TM2 and the fifth shaft TM5, and selectively connects the second shaft TM2 and the fifth shaft TM5, thereby controlling power delivery therebetween.

The first brake B1 is arranged between the first shaft TM1 and the transmission housing H, and selectively connects the first shaft TM1 to the transmission housing H.

The second brake B2 is arranged between the third shaft TM3 and the transmission housing H, and selectively connects the third shaft TM3 to the transmission housing H.

The control elements of the first, the second, the third, and the fourth clutch C1, C2, C3, and C4 and the first and, the second brake B1, B2 may be realized as multi-plate hydraulic pressure friction devices that are frictionally engaged by hydraulic pressure.

FIG. 2 is an operational chart for respective control elements at respective shift-stages in a planetary gear train according to one form of the present disclosure.

Referring to FIG. 2, a planetary gear train according to one form of the present disclosure realizes ten forward speeds and one reverse speed by operating three control elements among the first, the second, the third, and the fourth clutches C1, C2, C3, and C4 and the first and the second brakes B1 and B2 at respective shift-stages.

In the forward first speed D1, the third clutch C3 and the first and the second brakes B1 and B2 are simultaneously operated.

As a result, the fourth shaft TM4 is connected to the seventh shaft TM7 by the operation of the third clutch C3. In this state, the torque of the input shaft IS is delivered to the fourth shaft TM4 and the seventh shaft TM7.

In addition, the first shaft TM1, the third shaft TM3 acts as a fixed element by the operation of the first and the second brakes B1 and B2, thereby realizing the forward first speed by cooperative operation of respective shafts and delivering a shifted torque to the output shaft OS connected to the eighth shaft TM8.

In the forward second speed D2, the first clutch C1 and the first and the second brakes B1 and B2 are simultaneously operated.

As a result, the fifth shaft TM5 is connected to the seventh shaft TM7 by the operation of the first clutch C1. In this state, the torque of the input shaft IS is delivered to the fourth shaft TM4.

In addition, the first shaft TM1, the third shaft TM3 acts as a fixed element by the operation of the first and the second brakes B1 and B2, thereby realizing the forward second speed by cooperative operation of respective shafts and delivering a shifted torque to the output shaft OS connected to the eighth shaft TM8.

In the forward third speed D3, the first and the third clutches C1 and C3 and the second brake B2 are simultaneously operated.

As a result, the fifth shaft TM5 is connected to the seventh shaft TM7 by the operation of the first clutch C1 and the fourth shaft TM4 is connected to the seventh shaft TM7 by the operation of the third clutch C3. In this state, the torque of the input shaft IS is delivered to the fourth shaft TM4 and the seventh shaft TM7.

In addition, the third shaft TM3 acts as a fixed element by the operation of the second brake B2, thereby realizing the forward third speed by cooperative operation of respective shafts and delivering a shifted torque to the output shaft OS connected to the eighth shaft TM8.

In the forward fourth speed D4, the first and the fourth clutches C1 and C4 and the second brake B2 are simultaneously operated.

As a result, the fifth shaft TM5 is connected to the seventh shaft TM7 by the operation of the first clutch C1, and the second shaft TM2 is connected to the fifth shaft TM5 by the operation of the fourth clutch C4. In this state, the torque of the input shaft IS is delivered to the fourth shaft TM4.

In addition, the third shaft TM3 acts as a fixed element by the operation of the second brake B2, thereby realizing the forward fourth speed by cooperative operation of respective shafts and delivering a shifted torque to the output shaft OS connected to the eighth shaft TM8.

In the forward fifth speed D5, the third and the fourth clutches C3 and C4 and the second brake B2 are simultaneously operated.

As a result, the fourth shaft TM4 is connected to the seventh shaft TM7 by the operation of the third clutch C3, and the second shaft TM2 is connected to the fifth shaft TM5 by the operation of the fourth clutch C4. In this state, the torque of the input shaft IS is delivered to the fourth shaft TM4 and the seventh shaft TM7.

In addition, the third shaft TM3 acts as a fixed element by the operation of the second brake B2, thereby realizing the forward fifth speed by cooperative operation of respective shafts and delivering a shifted torque to the output shaft OS connected to the eighth shaft TM8.

In the forward sixth speed D6, the second and the third clutches C2 and C3 and the second brake B2 are simultaneously operated.

As a result, the sixth shaft TM6 is connected to the eighth shaft TM8 by the operation of the second clutch C2, and the fourth shaft TM4 is connected to the seventh shaft TM7 by the operation of the third clutch C3. In this state, the torque of the input shaft IS is delivered to the fourth shaft TM4 and the seventh shaft TM7.

In addition, the third shaft TM3 acts as a fixed element by the operation of the second brake B2, thereby realizing the forward sixth speed by cooperative operation of respective shafts and delivering a shifted torque to the output shaft OS connected to the eighth shaft TM8.

In the forward seventh speed D7, the first, the second, and the third clutches C1, C2, and C3 are simultaneously operated.

As a result, the fifth shaft TM5 is connected to the seventh shaft TM7 by the operation of the first clutch C1, the sixth shaft TM6 is connected to the eighth shaft TM8 by the operation of the second clutch C2, and the fourth shaft TM4 is connected to the seventh shaft TM7 by the operation of the third clutch C3. In this state, the torque of the input shaft IS is delivered to the fourth shaft TM4 and the seventh shaft TM7.

In this case, the first, the second, the third, and the fourth planetary gear sets PG1, PG2, PG3, and PG4 integrally rotate, and a torque is outputted as inputted, thereby forming the forward seventh speed and delivering a shifted torque to the output shaft OS connected to the eighth shaft TM8.

In the forward eighth speed D8, the second and the third clutches C2 and C3 and the first brake B1 are simultaneously operated.

As a result, the sixth shaft TM6 is connected to the eighth shaft TM8 by the operation of the second clutch C2, and the fourth shaft TM4 is connected to the seventh shaft TM7 by the operation of the third clutch C3. In this state, the torque of the input shaft IS is delivered to the fourth shaft TM4 and the seventh shaft TM7.

In addition, the first shaft TM1 acts as a fixed element by the operation of the first brake B1, thereby realizing the forward eighth speed, which is an overdrive gear, by cooperative operation of respective shafts and delivering a shifted torque to the output shaft OS connected to the eighth shaft TM8.

In the forward ninth speed D9, the third and the fourth clutches C3 and C4 and the first brake B1 are simultaneously operated.

As a result, the fourth shaft TM4 is connected to the seventh shaft TM7 by the operation of the third clutch C3, and the second shaft TM2 is connected to the fifth shaft TM5 by the operation of the fourth clutch C4. In this state, the torque of the input shaft IS is delivered to the fourth shaft TM4 and the seventh shaft TM7.

In addition, the first shaft TM1 acts as a fixed element by the operation of the first brake B1, thereby realizing the forward ninth speed, which is an overdrive gear, by cooperative operation of respective shafts and delivering a shifted torque to the output shaft OS connected to the eighth shaft TM8.

In the forward tenth speed D10, the second and the fourth clutches C2 and C4 and the first brake B1 are simultaneously operated.

As a result, the sixth shaft TM6 is connected to the eighth shaft TM8 by the operation of the second clutch C2, and the second shaft TM2 is connected to the fifth shaft TM5 by the operation of the fourth clutch C4. In this state, the torque of the input shaft IS is delivered to the fourth shaft TM4.

In addition, the first shaft TM1 acts as a fixed element by the operation of the first brake B1, thereby realizing the forward tenth speed, which is a highest gear, by cooperative operation of respective shafts and delivering a shifted torque to the output shaft OS connected to the eighth shaft TM8.

In the reverse speed REV, the second clutch C2 and the first and the second brakes B1 and B2 are simultaneously operated.

As a result, the sixth shaft TM6 is connected to the eighth shaft TM8 by the operation of the second clutch C2. In this state, the torque of the input shaft IS is delivered to the fourth shaft TM4.

In addition, the first shaft TM1 and the third shaft TM3 respectively act as fixed elements by the operation of the first and the second brakes B1 and B2, thereby realizing the reverse speed by cooperative operation of respective shafts and delivering a shifted torque to the output shaft OS connected to the eighth shaft TM8.

As described above, a planetary gear train according to one form of the present disclosure may realize the forward tenth speed and one reverse speed by operating four planetary gear set PG1, PG2, PG3, and PG4 by controlling four clutches C1, C2, C3, and C4 and two brakes B1 and B2.

In addition, a planetary gear train according to one form of the present disclosure may improve driving stability when shift-stages become suitable for rotation speed of an engine.

Moreover, a planetary gear train according to one form of the present disclosure may increase engine driving efficiency by multi-stages of an automatic transmission, and may further improve power delivery performance and fuel efficiency.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A planetary gear train of an automatic transmission for a vehicle, comprising:
   an input shaft configured to receive an engine torque;
   an output shaft configured to output a shifted torque;
   a first planetary gear set having a first, a second, and a third rotational elements;
   a second planetary gear set having a fourth, a fifth, and a sixth rotational elements;
   a third planetary gear set having a seventh, an eighth, and a ninth rotational elements;
   a fourth planetary gear set having a tenth, an eleventh, and a twelfth rotational elements;
   a first shaft fixedly connected to the first rotational element and the fourth rotational element;
   a second shaft fixedly connected to the second rotational element and the twelfth rotational element;
   a third shaft fixedly connected to the third rotational element;
   a fourth shaft fixedly connected to the fifth rotational element and connected to the input shaft;
   a fifth shaft fixedly connected to the sixth rotational element and the seventh rotational element, and selectively connected to the second shaft;
   a sixth shaft fixedly connected to the eighth rotational element;
   a seventh shaft fixedly connected to the ninth rotational element and the tenth rotational element, and selectively connected to the fourth shaft and the fifth shaft respectively; and
   an eighth shaft fixedly connected to the eleventh rotational element, selectively connected to the sixth shaft, and connected to the output shaft.

2. The planetary gear train of claim 1, wherein the first shaft and the third shaft are selectively connected to a transmission housing respectively.

3. The planetary gear train of claim 2, further comprising:
   a first clutch selectively connecting the fifth shaft and the seventh shaft;
   a second clutch selectively connecting the sixth shaft and the eighth shaft;

a third clutch selectively connecting the fourth shaft and the seventh shaft;

a fourth clutch selectively connecting the second shaft and the fifth shaft;

a first brake selectively connecting the first shaft and the transmission housing; and a second brake selectively connecting the third shaft and the transmission housing.

4. The planetary gear train of claim 1, wherein:

the first, the second, and the third rotational elements of the first planetary gear set are respectively a first sun gear, a first planet carrier, and a first ring gear of the first planetary gear set;

the fourth, the fifth, and the sixth rotational elements of the second planetary gear set are respectively a second sun gear, a second planet carrier, and a second ring gear of the second planetary gear set;

the seventh, the eighth, and the ninth rotational elements of the third planetary gear set are respectively a third sun gear, a third planet carrier, and a third ring gear of the third planetary gear set; and the tenth, the eleventh, and the twelfth rotational elements of the fourth planetary gear set are respectively a fourth sun gear, a fourth planet carrier, and a fourth ring gear of the fourth planetary gear set.

5. The planetary gear train of claim 1, wherein the first, the second, the third, and the fourth planetary gear sets are arranged in an order of the first, the second, the third, and the fourth from an engine side.

6. A planetary gear train of an automatic transmission for a vehicle, comprising:

an input shaft configured to receive an engine torque;

an output shaft configured to output a shifted torque;

a first planetary gear set having a first, a second, and a third rotational elements;

a second planetary gear set having a fourth, a fifth, and a sixth rotational elements;

a third planetary gear set having a seventh, an eighth, and a ninth rotational elements; and a fourth planetary gear set having a tenth, an eleventh, and a twelfth rotational elements, wherein the input shaft is connected to the fifth rotational element, the output shaft is connected to the eleventh rotational element, the first rotational element is fixedly connected to the fourth rotational element, the second rotational element is fixedly connected to the twelfth rotational element, the sixth rotational element is fixedly connected to the seventh rotational element, the ninth rotational element is fixedly connected to the tenth rotational element, the second rotational element is selectively connected to the sixth rotational element, the eighth rotational element is selectively connected to the eleventh rotational element, and the tenth rotational element is selectively connected to the fifth and the seventh rotational element respectively.

7. The planetary gear train of claim 6, wherein the first rotational element and the third rotational element are selectively connected to the transmission housing, respectively.

8. The planetary gear train of claim 7, further comprising:

a first clutch selectively connecting the seventh rotational element and the tenth rotational element;

a second clutch selectively connecting the eighth rotational element and the eleventh rotational element;

a third clutch selectively connecting the fifth rotational element and the tenth rotational element;

a fourth clutch selectively connecting the second rotational element and the sixth rotational element;

a first brake selectively connecting the first rotational element and the transmission housing; and a second brake selectively connecting the third rotational element and the transmission housing.

9. The planetary gear train of claim 6, wherein:

the first, the second, and the third rotational elements of the first planetary gear set are respectively a first sun gear, a first planet carrier, and a first ring gear of the first planetary gear set;

the fourth, the fifth, and the sixth rotational elements of the second planetary gear set are respectively a second sun gear, a second planet carrier, and a second ring gear of the second planetary gear set;

the seventh, the eighth, and the ninth rotational elements of the third planetary gear set are respectively a third sun gear, a third planet carrier, and a third ring gear of the third planetary gear set; and the tenth, the eleventh, and the twelfth rotational elements of the fourth planetary gear set are respectively a fourth sun gear, a fourth planet carrier, and a fourth ring gear of the fourth planetary gear set.

10. The planetary gear train of claim 6, wherein the first, the second, the third, and the fourth planetary gear sets are arranged in an order of the first, the second, the third, and the fourth from an engine side.

* * * * *